(12) United States Patent
Noiseux

(10) Patent No.: US 6,915,924 B1
(45) Date of Patent: Jul. 12, 2005

(54) BOTTLED WATER SOURCE TO SOFT DRINK DISPENSER MACHINE

(76) Inventor: Robert J. Noiseux, 447 S. Canterbury Rd., Canterbury, CT (US) 06331

(*) Notice: Subject to any disclaimer, the term of this patent is extended or adjusted under 35 U.S.C. 154(b) by 37 days.

(21) Appl. No.: 10/705,478

(22) Filed: Nov. 10, 2003

(51) Int. Cl.[7] .................................................. B67D 5/06
(52) U.S. Cl. ...................... 222/64; 222/185.1; 222/424
(58) Field of Search ......................... 222/64, 66, 146.6, 222/185.1, 424

(56) References Cited

U.S. PATENT DOCUMENTS

| | | | |
|---|---|---|---|
| 1,215,801 A | * | 2/1917 | Hancock ..................... 222/54 |
| 3,653,413 A | | 4/1972 | Sheta |
| 4,456,149 A | | 6/1984 | Sciortino |
| 4,844,796 A | | 7/1989 | Plester |
| 4,946,599 A | | 8/1990 | Craig |
| 4,947,739 A | | 8/1990 | Owen |
| 4,958,747 A | * | 9/1990 | Sheets ........................ 222/67 |
| 5,111,966 A | * | 5/1992 | Fridman ...................... 222/1 |
| 5,449,093 A | * | 9/1995 | Burrows ..................... 222/146.1 |
| 5,553,751 A | * | 9/1996 | Mowers ....................... 222/183 |
| 5,901,880 A | | 5/1999 | Clarke |
| 5,979,713 A | | 11/1999 | Grill |
| 6,453,955 B1 | * | 9/2002 | Lee ............................. 141/198 |
| 2002/0170921 A1 | * | 11/2002 | Tan et al. ..................... 222/67 |

* cited by examiner

Primary Examiner—Joseph A. Kaufman
(74) Attorney, Agent, or Firm—Richard L. Miller

(57) ABSTRACT

A water dispensing apparatus switches from a city water supply line to an auxiliary water reservoir when the city water supply line becomes unacceptable. A valve connects, alternatively, city water and auxiliary water supply lines to a consumer water supply line. Auxiliary water is supplied from a water accumulator to the auxiliary water supply line and replenished by pumping from the auxiliary water reservoir in response to detection by a pressure switch of low accumulator pressure. A check valve is inserted in the auxiliary water supply line downstream of an electric pump and upstream of the pressure switch. A low water level detector operates a switch to cut off power to the pump when the level of water in the auxiliary water supply reservoir falls below a predetermined value.

7 Claims, 1 Drawing Sheet

BOTTLED WATER SOURCE TO SOFT DRINK DISPENSER MACHINE

BACKGROUND OF THE INVENTION

1. Field of the Invention

The present invention relates to a water dispensing apparatus for providing an auxiliary supply of water to soft drink dispensing machines, ice maker etc., when water quality from a usual supply, such as city water, is of unacceptable quality.

2. Description of the Prior Art

Numerous proposal for innovations for water dispensing apparatus have been provided in the prior art that will be described. Even though these innovations may be suitable for the specific individual purposes to which they address, accordingly they differ from the present invention.

A FIRST EXAMPLE U.S. Pat. No. 3,653,413 to Sheya teaches a pump apparatus that is an economic and trouble-free apparatus for pumping drinking water from a source bottle positioned on the floor, where it is delivered, to an elevated vessel from which it can gravitationally flow. The apparatus comprises a centrifugal or other non-self priming pump which can be set directly on the mouth of the source bottle on the floor. A pump suction pipe extends into the source bottle. An elastomeric spheroidal squeeze bulb is serially connected to the pump, directly in its output line. Check valves are positioned on opposite sides of the squeez bulb, with the suction check valve preferably on the input side of the pump. Manual squeezing of the bulb primes the pump. A flexible hose from the squeeze bulb discharges the water to the elevated bottle.

Since the elevated vessel has a filling opening in the top and a discharge opening in the bottom, means are provided to close the bottom opening during filling to prevent the water from running directly out. This is alternatively accomplished by means of a float valve or by means of a manually operated valve which is closed during the filling operation.

A SECOND EXAMPLE U.S. Pat. No. 4,456,149 to Sciortino teaches an invention that relates to portable apparatuses for dispensing purified water from conventional five gallon water bottles directly into a spigot mounted on a sink or an ice maker of a refrigerator. The bottle of water does not have to be mounted on any known support or cabinet, but can remain in its upright position. The water is pumped directly from the bottle through a flexible tube upon drop in pressure in the transport line. A sensing mechanism detects this drop in pressure when the spigot is open and activates a motor which drives the pump. Second pressure switch de-activates the pump when the water runs out of the bottle to prevent overheating of the motor. The pump then has to be manually reset. A time release is provided when it is desired to connect the bottle to an ice maker, so that the pump continuously operates for several minutes to fill in the ice maker and then automatically stops.

A THIRD EXAMPLE U.S. Pat. No. 4,844,796 to Plester teaches a water treatment apparatus for use in a post-mix beverage dispenser that enables purification of water, removal of water hardness and sterilization of water which is normally accomplished by a precipitation/flocculation process used in a bottling plant. This apparatus can treat the water for beverage dispensing purposes and will not require high capital expenditures. The apparatus includes a removable, disposable cartridge having a reactor or first section filled with sand, carbon granules or other heat-conducting material for removing the bicarbonate content and other impurities from the water and a filter or second section having a filter and activated carbon screen for removing solids, traces of chlorine and dissolved organic material from the water. The apparatus also includes heat exchanger coils and a heating element for raising the temperature of the water as well as a holding tank having a gas trap for collecting and removing carbon dioxide and chlorine gas. Various arrangements may also be used in the apparatus to lower the temperature of the water after it has been raised and before it reaches a downstream dispensing portion. An ion-exchange resin may also be included in the second section of the cartridge of the apparatus in order to remove nitrates, sulfates and sodium ions from the water.

A FOURTH EXAMPLE U.S. Pat. No. 4,946,599 to Craig teaches apparatus and methods for converting a bottled water dispenser for use with a continuous source of water are disclosed. In a preferred embodiment, means for reducing the pressure and filtering the continuous source of water are provided. In a most preferred embodiment, th apparatus is configured to substantially reside within the existing dispenser apparatus, thus eliminating the need for bottled water. A housing is provided which contains a filter in an upper portion thereof, the lower portion shaped to conform to an existing tank within the bottled water dispenser in order to provide good thermal communication between the apparatus of the present invention and the existing refrigeration means. Chilled water is retained in the lower portion of the housing and is filtered upon demand, thus providing freshly filtered water to the user at a pressure and velocity substantially the same as that produced using a bottled source, without the contaminants expense and inconvenience associated with bottled water. Also provided are methods and apparatus for converting bottled water dispensers having means for dispensing heated water for use with a continuous source of water.

A FIFTH EXAMPLE U.S. Pat. No. 4,947,739 to Owen teaches a home carbonation system for producing soft drinks. A high pressure CO2 vessel comprises a regulator valve assembly which provides fail safe venting, a refill capability, and a low pressure output. It may be interconnected via a fill hose to a seltzer dispenser comprising a multifunction discharge valve secured to a plastic bottle. A plurality of syrup bottles, each filled with a different flavor of concentrate, enable the mixing of desired soda flavors. A storage rack efficiently houses the pressure vessel, the seltzer bottle, and the individual syrup containers. A pressure vessel housing box includes an offset nest which conveniently stores the fill tube. The seltzer bottle is reinforced by a two-piece, vented, anti-fragmentation shroud equipped with inspection slots for enabling proper mixing. The discharge valve is threadably coupled to the bottle, and it includes a gas inlet orifice for receiving low pressure gas from the regulator assembly. Charging gas admitted into the discharge valve is conducted beneath the liquid level by an internal siphon tube, and the vigorous bubbling which results invisible through the inspection slots. The discharge valve, which need not be removed from the bottle for subsequent dispensing of charged water, includes a manually operated lever adapted to trigger its internal valve elements for dispensing fluid from the seltzer bottle through an adjacent output tube, which vigorously squirts charged water into the awaiting users glass.

A SIXTH EXAMPLE U.S. Pat. No. 5,901,880 to Clarke teaches a bottled water delivery system that includes a pump which moves water from within a bottle to a desired output location. The system is such that heavy water bottles need not be moved and may be located at a significant preselected distance from the output location. A controller is provided to keep the pump from being actuated when there is no water available for pumping. The system is easily installed, inexpensive due to its simplicity, and requires a minimal input of power for operation.

A SEVENTH EXAMPLE U.S. Pat. No. 5,979,713 to Grill teaches an improved tap assembly including a tap, a delivery tube, and a rotatable cam for selectively compressing or not compressing a resilient flow control portion of the delivery tube in order to block or allow fluid flow therethrough. Also included is a decompression device for positively ensuring unrestricted flow through the resilient flow control portion when the cam is rotated to its opened position. The dispensed fluid may be pressurized by premixing with another fluid supplied by a manifold. The manifold is adapted to be connected to multiple pressurized sources of the another fluid. A diffuser is provided upstream of the flow control portion in order to effectively condition the dispensed fluid desired characteristics such as reduced velocity, laminar flow, and appearance. The tap and manifold have matable piloting members for easily guiding these components together in correct relation for a snap assembly. The tap assembly may dispense, for example, pressurized liquid beverages such as beer, wine, soft drinks, and the like. The subject invention may also be used to dispense non-pressurized liquids such as intravenously-fed medicine, food or nutrients, and the like.

SUMMARY OF THE INVENTION

AN OBJECT of the present invention is to provide a water dispensing apparatus for providing an auxiliary supply of water that avoids the disadvantages of the prior art.

ANOTHER OBJECT of the present invention is to provide a water dispensing apparatus for providing an auxiliary supply of water that is simple and inexpensive to manufacture.

STILL ANOTHER OBJECT of the present invention is to provide a water dispensing apparatus for providing an auxiliary supply of water that is simple to use.

According to one aspect, the invention provides a water dispensing apparatus for providing an auxiliary supply of water to a consumer when a city water source becomes unacceptable. Valve means connect, alternatively, one of a city water supply line and an auxiliary water supply line to a consumer water supply line. A water accumulator is connected to the auxiliary water supply line to supply water thereto; an auxiliary water supply reservoir is connected to the water accumulator; an electric pump is connected between the auxiliary water supply reservoir and the water accumulator for pumping water from the auxiliary water supply to the water accumulator; and, means are provided for sensing a water pressure output from the water accumulator and for electrically connecting the electric pump to a power source in response to the pressure detected falling below a predetermined value. When water the city water supply line becomes unacceptable, the valve means can be operated to disconnect the city water supply line from the consumer water line and to connect the auxiliary water supply line to the consumer water line so that water is supplied thereto from the water accumulator and when the water pressure output from the water accumulator falls below a predetermined value, the pressure switch operates to connect the electric pump to a power source to pump water from the auxiliary water supply reservoir to replenish the water accumulator.

Preferably, a check valve is inserted in the auxiliary water supply line downstream of the electric pump and upstream of the pressure switch.

Switching means for detecting a level of water in the auxiliary water supply reservoir is electrically connected in series with the electric pump so that when the level of water in the auxiliary water supply reservoir falls below a predetermined value, the switching means cuts off electrical power to the electric pump to prevent water being pumped from the auxiliary water supply reservoir to the water accumulator.

In one version the water accumulator is replenished and returns water through the same connection to the auxiliary water supply line affording simplicity of assembly.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The single FIGURE of the drawing is briefly described as follows.

Figure 1:
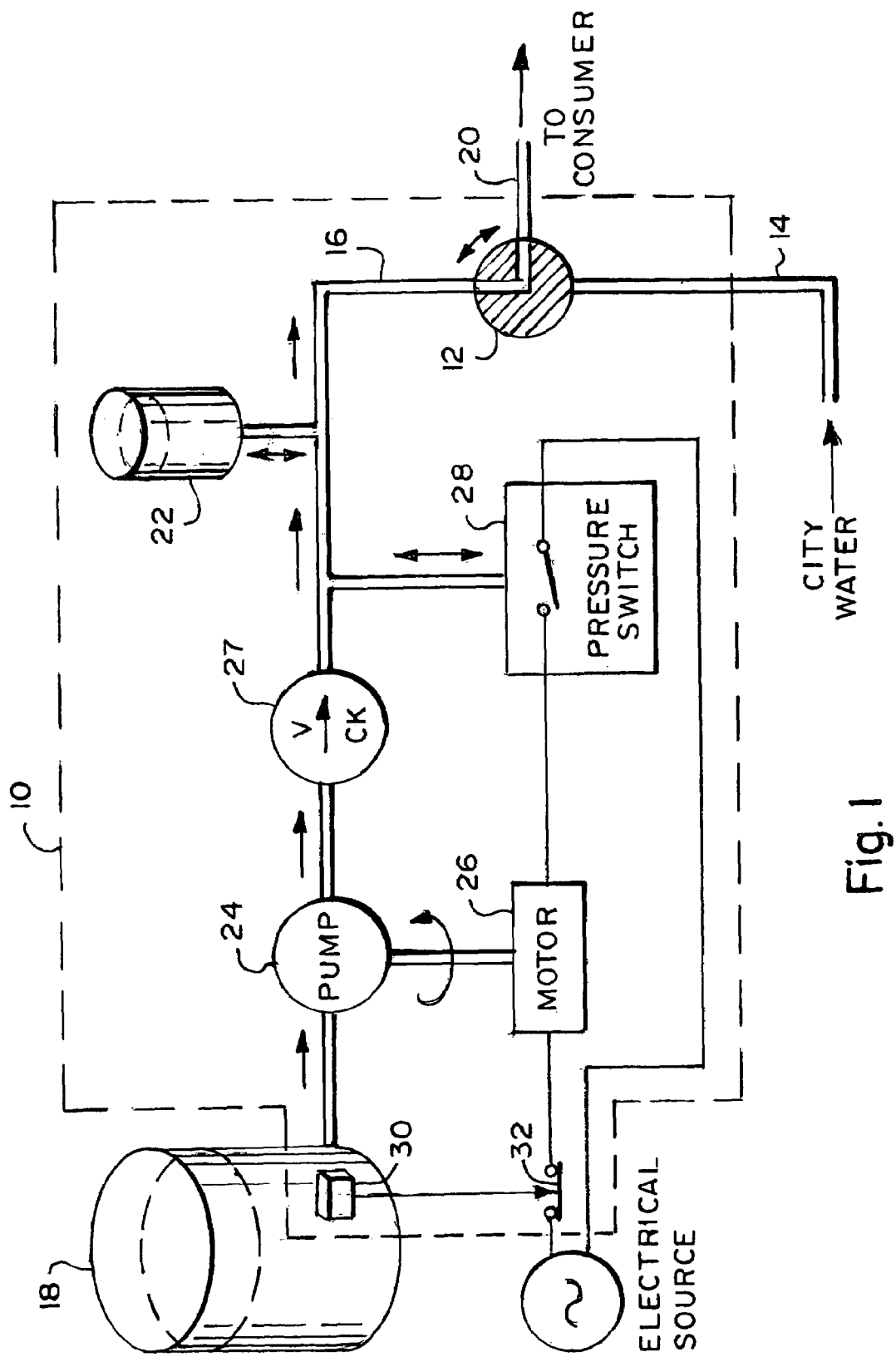
FIG. 1 is a block diagram illustrating the present invention and showing the relationship and connections between its component parts and external inputs and outputs.

A MARSHALING OF REFERENCE NUMERALS UTILIZED IN THE DRAWING 10 water dispensing apparatus
12 two way valve
14 city water supply line
16 auxiliary water supply line
18 auxiliary water supply reservoir
20 consumer water supply line
22 water accumulator
24 small positive displacement pump
26 electric motor
27 check valve
28 pressure switch
30 low water level detector
32 switch

DETAILED DESCRIPTION OF THE PREFERRED EMBODIMENT

As shown in the drawing, a water dispensing apparatus 10 comprises a two way valve 12 having ports switchable between a city water supply line 14 and an auxiliary water supply line 16 to an auxiliary water supply reservoir 18, such as a bottle or auxiliary water tank, to supply water to a consumer water supply line 20 connected to a consumer soft drink dispensing machine, ice maker etc.

The auxiliary water supply line 16 connects to a water accumulator 22 replenished from the auxiliary water supply reservoir 18 by a small positive displacement pump 24 powered by an electric motor 26 via check valve 27 in response to closure of a pressure switch 28 operatively connected to auxiliary water supply line 16 and the motor power circuit.

When the quality of the city water becomes unacceptable, the two way valve 12 is operated switched (manually or electrically) from the city water supply line 14 to the auxiliary water supply line 16 to feed water from the water accumulator 22 via the auxiliary water supply line 16 to consumer water supply line 20. When the pressure switch 28 detects a low pressure in the auxiliary water supply line 16 indicative of a low water level in the water accumulator 22 it closes, connecting the electric motor 26 to the small positive displacement pump 24 to pump water from the auxiliary water supply reservoir 18 to replenish the water accumulator 22.

A low water level detector 30 associated with the auxiliary water supply reservoir 18 operates a switch 32 wired in series with the electric motor 26 to cut the power supplied to the electric motor 26 when the water level of the auxiliary water supply reservoir 18 falls below a predetermined level to prevent air being pumped into the auxiliary water supply line 16.

The invention claimed is:

1. A water dispensing apparatus for providing an auxiliary supply of water to a consumer when a city water source becomes unacceptable comprising:
   a) valve means for connecting, alternatively, one of a city water supply line and an auxiliary water supply line to a consumer water supply line;
   b) a water accumulator connected to the auxiliary water supply line to supply water thereto;
   c) an auxiliary water supply reservoir connected to the water accumulator;
   d) an electric pump connected between the auxiliary water supply reservoir and the water accumulator for pumping water from the auxiliary water supply to the water accumulator; and
   e) means for sensing a water pressure output from the water accumulator and for electrically connecting the electric pump to a power source in response to the pressure detected falling below a predetermined value; whereby, when water in the city water supply line becomes unacceptable, the valve means can be operated to disconnect the city water supply line from the consumer water supply line and to connect the auxiliary water supply line to the consumer water supply line so that water is supplied thereto from the water accumulator and when the water pressure output from the water accumulator falls below a predetermined value, the pressure switch operates to connect the electric pump to a power source to pump water from the auxiliary water supply reservoir to replenish the water accumulator.

2. The water dispensing apparatus according to claim 1 wherein a check valve is inserted in the auxiliary water supply line downstream of the electric pump and upstream of the pressure switch.

3. The water dispensing apparatus according to claim 1 wherein a switching means for detecting a level of water in the auxiliary water supply reservoir is electrically connected in series with the electric pump so that when the level of water in the auxiliary water supply reservoir falls below a predetermined value, the switching means cuts off electrical power to the electric pump to prevent water being pumped from the auxiliary water supply reservoir to the water accumulator.

4. A water dispensing apparatus for providing an auxiliary supply of water to a consumer when a city water source becomes unacceptable, comprising:
   a) an auxiliary water supply line having an upstream end and a downstream end;
   b) valve means having an inlet for connecting, alternatively, to one of a city water supply line and the downstream end of the auxiliary water supply line and, an outlet for connecting to a consumer water supply line;
   c) an auxiliary water supply reservoir connected to the upstream end of the auxiliary water supply line;
   d) a water accumulator connected to the auxiliary water supply line at a location between the auxiliary water supply reservoir and the valve means;
   e) an electric pump connected into the auxiliary water supply line at a location between the auxiliary water supply reservoir and the water accumulator for pumping water from the auxiliary water supply reservoir to the water accumulator; and
   f) means connected to the auxiliary water supply line at a location between the electric pump and the valve means for sensing a water pressure output from the water accumulator and for electrical connection in series with the electric pump and a power source for connecting the electric pump to the power source to operate the electric pump in response to the pressure detected falling below a predetermined value; whereby, when a city water supply line becomes unacceptable, the valve means can be operated to disconnect the city water supply line from the consumer water supply line and to connect the auxiliary water supply line to the consumer water supply line so that water is supplied thereto from the water accumulator and when the water pressure output from the water accumulator falls below a predetermined value, the pressure switch operates to connect the electric pump to a power source to pump water from the auxiliary water supply reservoir to replenish the water accumulator.

5. The water dispensing apparatus according to claim 4 wherein a check valve is inserted in the auxiliary water supply line between the electric pump and the pressure switch and upstream of the water accumulator.

6. The water dispensing apparatus according to claim 5 wherein switching means for detecting a level of water in the auxiliary water supply reservoir is electrically connected in series with the electric pump so that when the level of water in the auxiliary water supply reservoir falls below a predetermined value, the switching means cuts off electrical power to the electric pump to prevent water being pumped from the auxiliary water supply reservoir to the water accumulator.

7. The water dispensing apparatus according to claim 6 wherein the water accumulator is connected both to receive water pumped from the auxiliary water supply reservoir during replenishment and to return the water to the auxiliary water supply line.

* * * * *